United States Patent [19]

Uno et al.

[11] Patent Number: 4,578,166
[45] Date of Patent: Mar. 25, 1986

[54] PROCESS OF ACTINIC IRRADIATION OF SHAPED POLYESTER IMIDE CONTAINING BENZOPHENONE TETRACARBOXYLIC DIIMIDE GROUP AND CROSS-LINKED PRODUCT

[75] Inventors: Keiichi Uno; Hikoichi Nagano; Tadashi Ikegami, all of Otsu, Japan

[73] Assignee: Toyo Boseki Kabushiki Kaisha, Osaka, Japan

[21] Appl. No.: 484,459

[22] Filed: Apr. 13, 1983

Related U.S. Application Data

[63] Continuation of Ser. No. 126,167, Feb. 29, 1980, abandoned.

[51] Int. Cl.[4] .......................... C08J 7/10; B32B 27/16
[52] U.S. Cl. ...................... 8/115.52; 264/22;
528/220; 528/229; 525/437; 8/115.53; 522/164; 522/165
[58] Field of Search .................. 204/159.19; 528/229, 528/220; 264/22

[56] References Cited

U.S. PATENT DOCUMENTS

| | | | |
|---|---|---|---|
| 3,518,175 | 6/1970 | Bell | 204/159.19 |
| 3,677,921 | 7/1972 | Stivers | 204/159.19 |
| 3,803,103 | 4/1974 | Magay | 528/289 |
| 3,892,768 | 7/1975 | Alvino et al. | 528/229 |
| 4,008,138 | 2/1977 | Rosen et al. | 528/220 |
| 4,141,886 | 2/1979 | Sollner et al. | 528/273 |
| 4,242,437 | 12/1980 | Rohloff | 204/159.14 |

Primary Examiner—Lewis T. Jacobs
Assistant Examiner—A. H. Koeckert
Attorney, Agent, or Firm—Birch, Stewart, Kolasch & Birch

[57] ABSTRACT

A shaped article made of a polymeric composition comprising as the essential component a saturated linear polyester or polyamide comprising a structural unit of the formula:

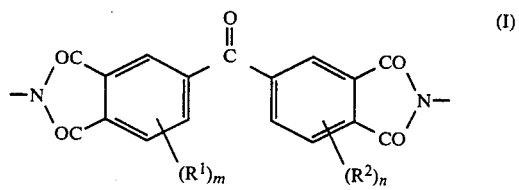

wherein $R^1$ and $R^2$ are same or different and each represents a monovalent organic group such as a monovalent aliphatic, alicyclic or aromatic group having one or more carbon atoms (preferably 1 to 20 carbon atoms) and m and n are each an integer of 0 to 3 in an amount of 0.01 to 50 moles per 100 moles of the total ester or amide linkages in the molecule of the polyester or polyamide is irradiated with actinic rays so that chain-linking takes place between or among the molecules of the polyester or polyamide, whereby the physical and chemical properties of the shaped article are favorably enhanced.

20 Claims, No Drawings

PROCESS OF ACTINIC IRRADIATION OF SHAPED POLYESTER IMIDE CONTAINING BENZOPHENONE TETRACARBOXYLIC DIIMIDE GROUP AND CROSS-LINKED PRODUCT

This application is a continuation of copending application Ser. No. 126,167, filed on Feb. 29, 1980, now abandoned.

BACKGROUND OF THE INVENTION

The present invention relates to a shaped article of a polymeric material and its production. More particularly, it relates to a shaped article made of a saturated linear polyester or polyamide having a certain specific structural unit and improved in various physical and chemical properties, and its production.

Saturated linear polyesters and polyamides can be readily shaped in their melt state, and their shaped products are excellent in mechanical properties, heat resistance, chemical resistance, etc. Because of this reason, they are used in various fields, for instance, as fibers, films, etc. Depending on their use, however, their physical or chemical properties are still not satisfactory, and their improvements are desired.

For instance, polyethylene terephthalate as a typical example of saturated linear polyesters is excellent in mechanical properties, heat resistance, dimensional stability, chemical resistance, etc. and used as a starting material for shaped articles such as fibers and films. When, however, heated in air for a long time, the mechanical properties are deteriorated; this is disadvantageous for the use as an electric insulating material, a tire cord or the like. When processed at high temperatures in various steps, the size is more or less changed; this is unfavorable for the use as films, fibers, fabrics, etc. The Young's modulus is still not sufficiently high for the use as a base for magnetic recording tape, a tire cord or the like. Pinhole resistance is poor so that it is not suitable for the use as a packaging film. In case of a biaxially stretched film, the strength in the thickness direction is small, and therefore breakage is easily produced when used as a packaging material, a base for magnetic recording card or the like. On the use as a base for magnetic recording tape, a metallized film or the like, the ligomers tend to move to the surface. These defects are more or less seen also in other saturated linear polyesters and polyamides.

In order to overcome these defects, various proposals including the copolymerization of appropriate monomeric components and the incorporation of suitable resinous materials and/or additives have been made. However, the improvement of some defective properties usually results in the loss of some favorable inherent properties. Thus, the improvement of inferior properties with maintenance of the advantageous inherent properties is generally difficult.

SUMMARY OF THE INVENTION

As the result of an extensive study, it has now been found that when shaped articles made of saturated linear polyesters and polyamides having certain structural units are irradiated with active rays, chain-linking takes place between or among their molecules so that the physical and chemical properties (e.g. heat resistance, thermal deterioration resistance, dimensional stability, mechanical properties, chemical resistance, oligomer transfer resistance) of the shaped articles are favorably enhanced without any material deterioration of their advantageous inherent properties. This invention is based on the above finding.

DETAILED DESCRIPTION

According to the present invention, a shaped article made of a polymeric composition comprising as the essential component a saturated linear polyester or polyamide comprising a structural unit of the formula:

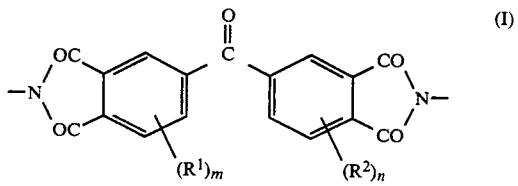

wherein $R^1$ and $R^2$ are the same or different and each represents a monovalent organic group such as a monovalent aliphatic, alicyclic or aromatic group having one or more carbon atoms (preferably 1 to 20 carbon atoms, more preferably 1 to 10 carbon atoms) and m and n are each an integer of 0 to 3 in an amount of 0.01 to 50 mols per 100 mols of the total ester or amide bonds in the molecule of the polyester or polyamide is irradiated with active rays so that chain-linking takes place between or among the molecules of the polyester or polyamide, whereby the physical and chemical properties of the shaped article are favorably enhanced.

Specific examples of the organic group represented by $R^1$ or $R^2$ are methyl, ethyl, propyl, phenyl, cyclohexyl, etc. The most ordinary is the case where m and n are each zero.

The polymeric composition for manufacture of the shaped article comprises as the essential component the saturated linear polyester or polyamide having the structural unit (I). Thus, the polymeric composition may comprise usually the saturated linear polyester or polyamide having the structural unit (I) in an amount of not less than 0.1% by weight (as the weight of the structural unit (I)) based on the weight of the polymeric composition.

In case of the saturated linear polyester, the monomeric compound of the formula:

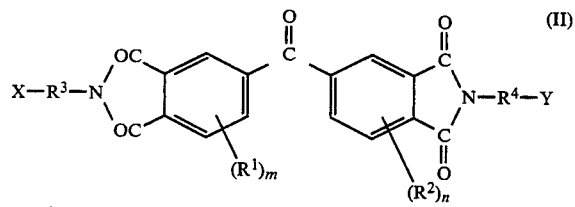

wherein $R^3$ and $R^4$ are each a divalent aliphatic, alicyclic or aromatic group having one or more carbon atoms, preferably 1 to 20 carbon atoms (more preferably 1 to 10 carbon atoms), and containing optionally an ether bond, an ester bond, an amide bond, an imide bond or the like and X and Y are each a hydroxyl group in its free or activated form (e.g. esterified hydroxyl) or a carboxyl group in its free or activated form (e.g. esterified carboxyl, halocarbonyl), and $R^1$, $R^2$, m and n are each as defined above, or it precursor may be used for introduction of the structural unit (I) therein. Specific examples of the divalent group represented by $R^3$ or $R^4$ are methylene, ethylene, phenylene, cyclohexylene, etc.

Such monomeric compound (II) or its precursor may be prepared by the reaction between (A) a benzophenonetetracarboxylic acid optionally having a substituent(s) on the benzene ring(s) or its functional derivative (preferably the acid anhydride) and (B) a compound having one primary amino group and at least one ester-forming functional group. The term "ester-forming functional group" hereinabove used is intended to mean a group which reacts with an alcoholic OH in a free or activated form or a carboxylic COOH in a free or activated form to leave an ester bond. Examples of the compound (B) are alkanolamines having 2 to 10 carbon atoms (e.g. ethanolamine, propanolamine, butanolamine), amino acids having 2 to 10 carbon atoms (e.g. glycine, β-alanine, γ-amino-n-butyric acid, p-aminobenzoic acid, m-aminobenzoic acid), etc.

For production of the saturated linear polyester, there are used (C) dicarboxylic acids or their functional derivatives, (D) diols or their functional derivatives (E) lactones or oxycarboxylic acids or their functional derivatives, etc. in addition to the said monomeric compound (II). Examples of the dicarboxylic acids (C) are terephthalic acid, isophthalic acid, naphthalenedicarboxylic acid, diphenyldicarboxylic acid, diphenoxyethanedicarboxylic acid, (5-sodium sulfo)isophthalic acid, succinic acid, adipic acid, sebacic acid, dodecanedioic acid, dicarboxylic acids having an imide linkage, etc. Examples of the diols (D) are ethylene glycol, trimethylene glycol, 1,2-propylene glycol, tetramethylene glycol, hexamethylene glycol, neopentyl glycol, 1,4-cyclohexanediol, 1,4-cyclohexanedimethanol, diethylene glycol, triethylene glycol, polyethylene glycol (having a molecular weight of not more than 10,000), polytetramethylene glycol (having a molecular weight of not more than 10,000), resorcinol, hydroquinone, 2,2-bis(4,4'-hydroxyphenyl)propane, etc. Examples of the lactones or oxycarboxylic acids (E) are β-propiolactone, ε-caprolactone, m-hydroxybenzoic acid, p-hydroxybenzoic acid, N-hydroxyethyltrimellitic acid imide, etc.

Further, the saturated linear polyester may include the units originated from trifunctional compounds such as glycerol, pentaerythritol, trimellitic acid and pyromellitic acid insofar as such polyester can be substantially shaped or molded in a melt state.

The saturated linear polyester may be produced from the said monomeric materials including the monomeric compound (II) by a per se conventional procedure. For instance, a dicarboxylic acid alkyl ester and an alkylene glycol are heated in the presence of a catalyst to give a glycol ester, which is then heated at a temperature higher than the melting point under a highly reduced pressure. At any stage in such process, the monomeric compound (II) may be added to the reaction system. When, however, it has a carboxyl group, it is preferably added to the reaction system after the completion of the ester exchange between the dicarboxylic acid alkyl ester and the alkylene glycol. In case of the monomeric compound (II) being added to the polyester having an intrinsic viscosity of more than 0.3, sufficient heating over the melting point of the polyester is effected so as to accomplish the ester exchange, and then heating is further continued at a high temperature under reduced pressure for repolymerization. In place of the monomeric compound (II) itself, the benzophenonetetracarboxylic acid optionally having a substituent(s) (A) and the compound (B) or an addition product between them (i.e. the amidic acid) may be subjected to reaction at the stage for polymerization. Further, the product after the polycondensation in a melt state may be once taken out from the reactor and, in the form of chips or powders, subjected to solid phase polymerization by a per se conventional procedure.

On the production of the saturated linear polyester, there is usually employed a catalyst, of which examples are metallic elements and their compounds such as oxides, hydroxides, carboxylates, alcoholates, halides, complexes and double salts. As the catalyst for ester exchange, carboxylates (e.g. acetate, butyrate), alcoholate complexes, double salts, etc. of metals (e.g. Ca, Sr, Ba, Zn, Mn, Pb, Ti) are usable. Among them, the use of calcium acetate, zinc acetate, manganese acetate, potassium titanyl oxalate, etc. is favorable. Examples of the catalyst for polycondensation are antimony trioxide, germanium dioxide, lead dioxide, potassium titanyl oxalate, etc. Further, amines (e.g. triethylamine, pyridine, morpholine), alkali metal salts of carboxylic acids (e.g. potassium terephthalate, sodium acetate, lithium acetate) and the like are usable as an inhibitor for formation of an ether linkage, and phosphoric acid, phosphorous acid, phosphonic acid, their esters and the like are utilizable as a stabilizer. The amount of the catalyst to be introduced into the reaction system is usually from 0.001 to 0.1 mol %, preferably from 0.005 to 0.05 mol %, on the basis of the total acid components.

The thus prepared saturated linear polyester is required to have the structural unit (I) in an amount of 0.01 to 50 mol per 100 mol of the total ester linkages. When the amount is less than the lower limit, chain-linking hardly occurs on irradiation. Larger is better, but the excessive amount over the upper limit is unnecessary. A favored amount is from 0.1 to 20 mol per 100 mol of the total ester linkages, and the most favored amount is from 0.5 to 10 mol per 100 mol of the total ester linkages.

Among various saturated linear polyesters, the one wherein not less than 50 mol % of the dicarboxylic acid units is units of benzenedicarboxylic acid and not less than 50 mol % of the diol units is units of an alkylene glycol having $C_2$ to $C_{10}$ carbon atoms is favorable. Further, the one having a repeating unit representable by either one of the following formulae in an amount of 0.01 to 50 mol per 100 mol of the total ester linkages is preferred:

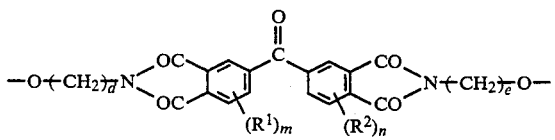

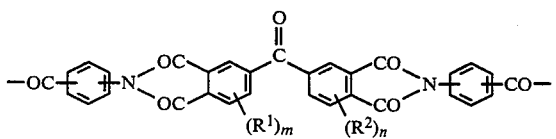

and

-continued

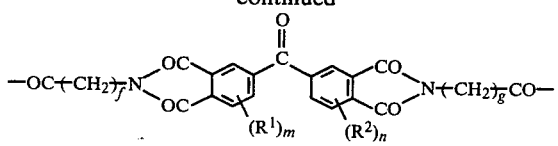

wherein d and e are each an integer of 2 to 6 and f and g are each an integer of 1 to 6, and R¹, R², m and n are each as defined above.

A saturated linear polyester comprising units of terephthalic acid as the dicarboxylic acid component and units of a $C_2$ to $C_{10}$ alkylene glycol and of the following formula in a molar proportion of 99.9:0.1 to 80:20 as the diol component is the most preferred one:

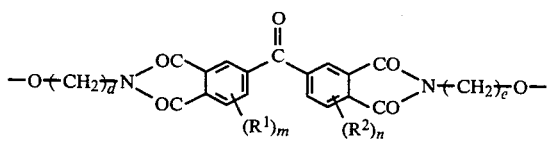

wherein R¹, R², m, n, d and e are each as defined above.

The saturated linear polyester as obtained above has generally an intrinsic viscosity of 0.3 to 1.5 dl/g when determined in a mixture of phenol and sym-tetrachloroethane in a weight ratio of 60:40 at 30° C.

In case of the saturated linear polyamide, the monomeric compound of the formula:

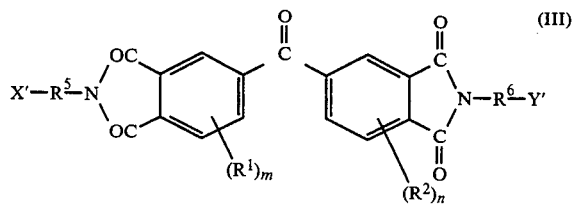

wherein R⁵ and R⁶ are each a divalent aliphatic, alicyclic or aromatic group having one or more carbon atoms, preferably 1 to 20 carbon atoms (more preferably 1 to 10 carbon atoms), and containing optionally an ether bond, an ester bond, an amide bond, an imide bond or the like and X' and Y' are each a primary or secondary amino group in a free or activated form (e.g. amide) or a carboxyl group in a free or activated form (e.g. esterified carboxyl, halocarbonyl), and R¹, R², m and n are each as defined above, or its precursor may be used for introduction of the structural unit (I) therein. Specific examples of the divalent group represented by R⁵ or R⁶ are methylene, ethylene, hexamethylene, phenylene, cyclohexylene, etc. Such monomeric compound (III) or its precursor may be prepared by the reaction between the benzophenonetetracarboxylic acid optionally having a substituent(s) on the benzene ring(s) or its functional derivative (preferably the acid anhydride) (A) and (F) a compound having one primary amino group and at least one amide-forming functional group. The term "amide-forming functional group" hereinabove used is intended to mean a group which reacts with a carboxylic COOH in a free or activated form or an amino NH₂ in a free or activated form to leave an amide bond. Examples of the compound (F) are diamines having 2 to 10 carbon atoms (e.g. ethylene diamine, propylene diamine, tetramethylene diamine, hexamethylene diamine), amino acids having 2 to 10 carbon atoms (e.g.

glycine, β-alanine, γ-amino-n-butyric acid, p-aminobenzoic acid, m-aminobenzoic acid), etc.

For production of the saturated linear polyamide, there are used (G) dicarboxylic acids or their functional derivatives (H) diamines or their functional derivatives, (J) lactams or amino acids or their functional derivatives, etc. Examples of the dicarboxylic acids (G) are terephthalic acid, isophthalic acid, phthalic acid, naphthalenedicarboxylic acid, diphenyldicarboxylic acid, diphenoxyethanedicarboxylic acid, (5-sodium sulfo)isophthalic acid, succinic acid, adipic acid, sebacic acid, dodecanedicarboxylic acid, dicarboxylic acids having an imide linkage, etc. Examples of the diamines (H) are ethylene diamine, propylene diamine, tetramethylene diamine, hexamethylene diamine, polyethylene oxide diamine, polytetramethylene oxide diamine, p-xylylene diamine, o-xylylene diamine, m-xylylene diamine, p-phenylene diamine, o-phenylene diamine, m-phenylene diamine, 4,4'-diaminodiphenylmethane, etc. Examples of the lactams or amino acids (J) are ε-caprolactam, glycine, β-alanine, γ-amino-n-butyric acid, p-aminobenzoic acid, m-aminobenzoic acid, etc.

The saturated linear polyamide may be produced from the said monomeric materials including the monomeric compound (III) by a per se conventional procedure. For instance, the nylon salt formed from a dicarboxylic acid and a diamine is heated in the presence of water under an elevated pressure to give a low polymer and, after releasing the pressure gradually, polycondensation is carried out. Since the monomeric compound (III) has an amino group and/or a carboxyl group at the terminal end(s), it may be subjected to reaction in substantially the same manner as in ordinary amino compounds or carboxylic acids. In case of a lactam, the ring opening polymerization may be carried out in the presence of water, if desired, under the coexistence of an alkali metal or an alkaline earth metal. It is usually performed while heating under atmospheric pressure. At an optional stage, the monomeric compound (III) in the form of an amine salt may be added to the reaction system for copolymerization.

The saturated linear polyamide includes the structural unit (I) in an amount of 0.01 to 50 mol per 100 mol of the total amide linkages. When the amount is smaller than the lower limit, chain-linking hardly takes place on irradiated. A higher amount affords a better result. But, the amount over the upper limit is not necessary. The preferable amount is from 0.1 to 20 mol, particularly from 1 to 10 mol, to 100 mol of the total amide linkages.

Among various saturated linear polyamides, the one wherein not less than 50 mol % of the structural units is units of either one of the formulae:

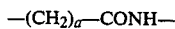

and

wherein a is an integer of 5 to 11, b is an integer of 2 to 6 and c is an integer of 2 to 10 is favorable. Further, the one having a structural unit representable by either one of the following formulae in an amount of 0.01 to 50 mol per 100 mol of the total amide linkages is preferred:

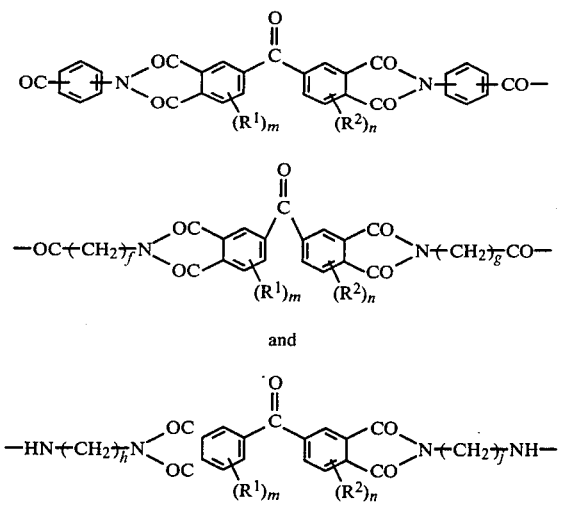

wherein h and j are each an integer of 2 to 6 and $R^1$, $R^2$, m, n, f and g are each as defined above.

A saturated linear polyamide comprising units of the formula:

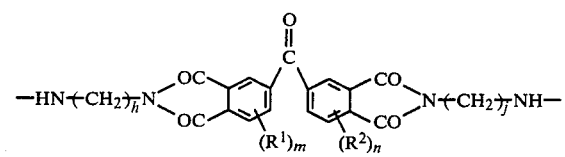

wherein $R^1$, $R^2$, m, n, h and j are each as defined above and units of either one of the formulae:

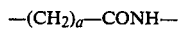

and

wherein a, b and c are each as defined above in a molar proportion of 0.1:99.9 to 20:80 is the most preferred one.

The thus prepared saturated linear polyamide has usually a relative viscosity of 2.0 to 3.0 when measured in conc. sulfuric acid at a concentration of 1% by weight at 20° C.

The polymeric composition for manufacture of the shaped article of the invention may comprise, in addition to the saturated linear polyester or polyamide having the structural unit (I), any polyester or polyamide which does have or does not have the structural unit (I) in the molecule.

Further, the polymeric composition may comprise other resins such as polyolefins (e.g. polyethylene, polypropylene), rubbery polymers (e.g. polyisoprene, poly(acrylonitrile/butadiene), polybutadiene, poly(styrene/butadiene)), polyamides (e.g. Nylon 6, Nylon 6.6, Nylon 11, Nylon 12), thermoplastic polyester elastomers (e.g. polyethylene terephthalate/polyethylene glycol block copolymer, polyethylene terephthalate/polybutylene glycol block copolymer, polybutylene terephthalate/polyethylene glycol block copolymer, polybutylene terephthalate/polybutylene glycol block copolymer), thermoplastic polyurethane elastomers, polypropylene oxide, polycarbonates, poly(organic siloxanes) and fluorine-containing polymers, etc.

Furthermore, the polymeric composition may comprise lubricants, ultraviolet ray absorbers, antioxidants, antistatic agents, glass fibers, carbon fibers, foaming agents, other resins, pigments, dyestuffs, flame retardants, etc. depending on the use.

For preparation of a shaped article, the polymeric composition may be formed by a per se conventional shaping process such as extrusion, injection, compression, blowing or inflation. For instance, it can be shaped in a melt state to give a shaped article such as fibers, films or bottles. When desired, stretching, heat treatment, etc. may be applied after shaping. Further, any secondary processing such as printing, plating, metallization or layering with any film or foil may be applied.

The thus obtained shaped article is then irradiated with active rays so that the saturated linear polyester or polyamide having the structural unit (I) is chain-linked. The mechanism for the chain-linking of the saturated linear polyester or polyamide having the structural unit (I) on the irradiation with active rays is still not clear. Probably, the ketonic group in the structural unit (I) absorbs a photon and is excited to withdraw the hydrogen atom in the other molecular chain, and a new chemical bond is formed between the molecular chains due to the radical reaction-like chemical reaction. In these reactions, an imide group in the structural unit (I) acts effectively and enhances the activity of the photochemical reaction. Thus, the term "chain-linked" or "chain-linking" used in this specification is intended to mean such state that two or more molecules are linked by a chain(s), and the resulting product covers from the one soluble in a solvent to the one not soluble in a solvent (i.e. a gelled product).

The irradiation may be carried out by a per se conventional procedure. As the light source, there may be employed a high pressure mercury lamp, a low pressure mercury lamp, a xenon lamp, a sunlight, etc. In general, the ultraviolet rays having a wavelength of 200 to 400 $m\mu$, preferably a wavelength of 310 to 400 $m\mu$, is favorably employed. Other electromagnetic waves are also usable. As to the conditions of irradiation such as irradiation time and irradiation atmosphere, no particular limitation is present. Usually, the irradiation time may be from 0.1 second to 30 minutes depending on the physical or chemical properties as desired. Even if the irradiation is effected in an atmosphere of oxygen, the chain-linking is not substantially inhibited. In view of the irradiation efficiency, the irradiation is performed at a temperature higher than the glass transition temperature of the shaped article before irradiation and lower than the melting point of such article. The irradiation strength is usually not less than 1 W/m$^2$, preferably from about 10 to 1000 W/m$^2$, more preferably from about 50 to 300 W/m$^2$.

The shaped article after chain-linking is excellent in heat resistance such as dimensional stability and thermal deterioration resistance, mechanical properties such as strength and elongation characteristics, folding resistance and pinhole resistance, chemical resistance such as solvent resistance, sliding property, adhesiveness, printability, gas barrier property, etc. and useful as an electric insulating material, a base for magnetic recording tape, a packaging material, etc.

Explaining the characteristic use of the shaped article after chain-linking by way of examples, a stretched or unstretched film of polyethylene terephthalate or polybutylene terephthalate containing the structural unit (I) in an amount of 0.5 to 5 mol per 100 mol of the total ester linkages provided a metal layer (e.g. copper, aluminum, silver) thereon is useful as a base for printed wiring board. Particularly, an unstretched film of polyethylene terephthalate or polybutylene terephthalate containing the structural unit (I) in an amount of 2 to 5 mol per 100 mol of the total ester linkages after irradiation can retain advantageously its original shape even when immersed in a soldering bath at a temperature of 260° to 300° C. Further, the unstretched film may be layered with a glass cloth so as to give a carrier tape of integrated circuit.

A biaxially stretched film of polyethylene terephthalate containing the structural unit (I) in an amount of 0.1 to 2 mol per 100 mol of the total ester linkages after irradiation has favorable characteristics as a base for magnetic recording tape. Such film is excellent in dimensional stability on the processing such as coating and slitting. Further, the transference of the oligomer to the surface is prevented, and the elasticity is quite good.

A biaxially stretched film of polyethylene terephthalate containing the structural unit (I) in an amount of 0.1 to 2 mol per 100 mol of the total ester linkages after irradiation is particularly useful as an electric insulating material, because thermal deterioration hardly occurs even when employed at a high temperature for a long period of time so that the allowable temperature limit can be made higher. Thus, it serves to miniturization of mechanical or electrical instruments and increase of reliance on mechanical or electrical instruments. When irradiation is effected sufficiently, the resulting film becomes hardly meltable and serves to decrease the accident due to overcurrent.

A biaxially stretched film of polyethylene terephthalate containing the structural unit (I) in an amount of 0.1 to 1 mol per 100 mol of the total ester bond after appropriately irradiated has excellent folding resistance, impact resistance and pinhole resistance and therefore are useful as a base for magnetic card or a packaging film.

PREFERRED EMBODIMENTS

Practical and presently preferred embodiments of the invention are illustratively shown in the following Examples wherein part(s) and % are by weight unless otherwise indicated.

EXAMPLE 1

In a 4 liter volume autoclave equipped with a distillation apparatus and an agitator, dimethyl terephthalate (1144 g; 5.89 mol), ethylene glycol (720 ml; 13 mol), zinc acetate dihydrate (418 mg) and antimony trioxide (358 mg) were charged, and the resultant mixture was heated at a temperature of 145° to 215° C. for 120 minutes while eliminating the by-product methanol by distillation so that ester exchange proceeded. After addition of N,N'-bis(β-hydroxyethyl)benzophenonetetracarboxylic acid imide (126.6 g) thereto, the resultant mixture was stirred at 215° C. under atmospheric pressure for 15 minutes, and the temperature was elevated with reduction of the pressure so as to reach to a temperature of 275° C. and a pressure of 0.04 mmHg after 50 minutes. The thus reached temperature and pressure were maintained as such for 30 minutes, during which polycondensation proceeded to give a polymer having an intrinsic viscosity of 0.637 dl/g. Its melting point (indicated by the melting peak temperature in the thermogram obtained by measurement using a differential scanning calorimeter at an elevation rate of 20° C./minute) was 252° C.

For comparison, there was produced polyethylene terephthalate not copolymerized with N,N'-bis(β-hydroxyethyl)benzophenonetetracarboxylic acid imide in substantially the same manner as above. Intrinsic viscosity, 0.620 dl/g. M.P., 260° C.

The polymer as above prepared was, after drying, melt extruded at a temperature of 285° to 290° C. to give an unstretched film of 300 microns in thickness. The unstretched film was stretched at a draw ratio of 3.5 in machine direction and at a draw ratio of 3.6 in transverse direction, followed by heat treatment at 200° C. to give a biaxially stretched film of 24 microns in thickness. The biaxially stretched film was heated at 120° C. and irradiated with a high pressure mercury lamp of 450 W sustained above the film at a distance of 10 cm for 10 seconds or 10 minutes.

In case of the polymer of Example 1, the film after irradiation for 10 minutes did not melt even on a hot plate heated at 265° C. and had a gel fraction of 86%. The film after irradiation for 10 seconds had an intrinsic viscosity of 0.669, which was higher than the intrinsic viscosity (0.609) before irradiation, and a gel fraction of 2%. The film before irradiation in case of the polymer of Example 1 as well as the films before and after irradiation in case of the polymer for comparison melted on a hot plate heated at 265° C. and showed no gel production.

The term "gel" hereinabove used is intended to mean insoluble materials after heating the film tested (1 g) in a mixture of phenol and sym-tetrachloroethane (60:40 by weight) (250 ml) at 120° C. for 2 hours. The gel fraction was calculated from the weight obtained by collecting the insoluble materials on a glass filter No. 2, washing the collected materials with the said solvent mixture and chloroform in order and drying.

EXAMPLE 2

Into an autoclave, N,N'-bis(β-aminoethyl)benzophenonetetracarboxylic acid imide adipate (11.05 parts), ε-caprolactam (110.7 parts), water (34 parts) and silica ("Syloid No. 150"; manufactured by Fuji Devison Co.) (0.24 part) were charged, and the atmosphere in the autoclave was replaced by nitrogen. The autoclave was closed and heated at 180° C. for 3 hours, and then the pressure was released to atmospheric pressure in 1 hour, during which the temperature was raised up to 260° C. The reaction was continued for further 7 hours under atmospheric pressure. The produced polymer was discharged from the autoclave by nitrogen pressure, washed with hot water of 80° C. for 16 hours and dried at 90° C. under reduced pressure for 24 hours to give a polymer having a melting point of 215° C. and a relative viscosity of 2.45 (when determined in 96% sulfuric acid at a concentration of 1 g/dl at 20° C.). By the use of a heat press, the polymer was shaped at 270° C. into an unstretched film of about 100 microns in thickness.

By the use of a TM Long stretching machine, the unstretched film was simultaneously and biaxially stretched with a stretching rate of 30,000%/minute at a draw ratio of 3 (machine direction)×3 (transverse direction). The biaxially stretched film was fixed on a metallic frame and treated with hot air of 200° C. for 30 seconds. The thus heat set film showed good transparency.

The above prepared unstretched or stretched film kept at 125° C. was irradiated with a high pressure mercury lamp (manufactured by Nippon Battery Co., Ltd.) at a photostrength at 170 W/m² or 225 W/m²

(measured by the use of a UV photometer UV-365 manufactured by Ushio Electric Co., Ltd.).

For comparison, Nylon 6 (i.e. polycaprolactam) was manufactured, and an unstretched or stretched film made of such Nylon 6 was also subjected to irradiation as above.

The results are shown in Table 1, from which it may be understood that by the irradiation, the unstretched or stretched film of Example 2 showed increase in viscosity and became hardly soluble into solvents. The unstretched or stretched film of Nylon 6 for comparison showed decrease in viscosity.

The viscosity was determined by measuring the relative viscosity of a solution of the film tested (200 mg) in 96% sulfuric acid (20 ml) at 25° C. using an Ostwald viscometer.

The insoluble material content was determined by dissolving the film tested (1 g) in 96% sulfuric acid (100 ml) at room temperature while shaking overnight, filtering the resultant solution with a glass filter No. 2 with suction, washing the collected insoluble materials with water, drying the washed insoluble materials at 120° C. in vacuo for 2 hours, cooling the dried materials to room temperature and weighing the cooled materials, followed by calculating the percentage of the obtained weight to the initial weight of the film.

EXAMPLE 4

In an autoclave, a mixture of terephthalic acid (41.7 kg), ethylene glycol (31.2 kg), antimony trioxide (18.3 g), triethylamine (76.2 g), trimethyl phosphate (4.6 g) and "Syloid No. 150" (25 g) was heated at a temperature of 240° C. under a pressure of 3.5 kg/cm$^2$ for 105 minutes, and the pressure was released to atmospheric pressure. After addition of N,N'-bis($\beta$-hydroxyethyl)-benzophenonetetracarboxylic acid imide (2051 g,) heating was continued at 240° C. under atmospheric pressure for 15 minutes. The reaction mixture was transferred to a reactor for polycondensation, and the polycondensation was carried out in substantially the same manner as in Example 3 to give a polymer having a melting point of 255° C. and a reduced specific viscosity of 0.674 dl/g (determined by dissolving the polymer (100 mg) in a mixture of phenol and sym-tetrachloroethane in a weight ratio of 6:4 (25 ml) and subjecting to measurement at 30° C.).

EXAMPLE 5

The polymer obtained in Example 3 was dried at 140° C. in vacuo overnight and extruded at 285° C. through a T die of 500 mm wide by the aid of an extruder, cooled with a casting roll having a surface temperature of 30°

TABLE 1

| | Irradiation conditions | | Example 2 | | | | Comparison | | | |
|---|---|---|---|---|---|---|---|---|---|---|
| | | | Unstretched | | Biaxially stretched | | Unstretched | | Biaxially stretched | |
| Temp. (°C.) | Photo-strength (W/m$^2$) | Time (min.) | Viscosity | Insoluble material content (%) | Viscosity | Insoluble material content (%) | Viscosity | Insoluble material content (%) | Viscosity | Insoluble material content (%) |
| Before irradiation | | | 2.42 | 0 | 2.29 | 0 | 2.59 | 0 | 2.41 | 0 |
| 125 | 170 | 0.15 | 2.85 | 0 | 2.77 | 0 | — | — | — | — |
| 125 | 170 | 0.3 | 3.21 | 0 | 3.06 | 0 | 2.43 | 0 | 2.32 | 0 |
| 125 | 225 | 5 | — | 64 | — | 75 | — | — | — | — |
| 90 | 225 | 0.1 | 3.42 | 0 | 3.54 | 0 | 2.41 | 0 | 2.26 | 0 |
| 90 | 225 | 1 | — | 32 | — | 38 | — | — | — | — |
| 90 | 225 | 5 | — | 63 | — | 70 | 2.07 | 0 | 2.03 | 0 |
| 90 | 225 | 10 | — | 81 | — | 89 | — | — | — | — |

EXAMPLE 3

In an autoclave, a mixture of terephthalic acid (42.8 kg), ethylene glycol (32.0 kg), antimony trioxide (18.8 g), triethylamine (78.3 g), trimethyl phosphate (4.7 g) and "Syloid No. 150" (25 g) was heated at a temperature of 240° C. under a pressure of 3.5 kg/cm$^2$ for 105 minutes, and the pressure was released to atmospheric pressure. Separately, benzophenonetetracarboxylic acid dianhydride (415.4 g), monoethanolamine (158.3 g) and ethylene glycol (1289 ml) were heated at 140° C. under nitrogen atmosphere for 3 hours, and the reaction mixture was added to the said autoclave, followed by heating at 240° C. under atmospheric pressure for 15 minutes. The reaction mixture was transferred to a 150 liter volume reactor for polycondensation, the temperature was elevated from 240° C. to 280° C. in 75 minutes with gradual reduction of the pressure to 0.1 mmHg, and the polycondensation was continued at 280° C. under 0.1 mmHg for 70 minutes to give a polymer having a melting point of 260° C. and a reduced specific viscosity of 0.652 dl/g (determined by dissolving the polymer (100 mg) in a mixture of phenol and sym-tetrachloroethane in a weight ratio of 6:4 (25 ml) and subjecting to measurement at 30° C.).

C. and taken up at a take-up speed of 15 m/minute to give an unstretched film of 0.2 mm in thickness and 420 mm in width.

The unstretched film was stretched sequentially and biaxially according to the roll/tenter process. Thus, the stretching in machine direction was effected at 80° C. with a draw ratio of 3.5, and that in transverse direction was carried out at 115°. C. with a draw ratio of 3.8, followed by heat set at 205° C. with a relaxation of 5%. The thus obtained biaxially stretched film has a thickness of 15 microns and showed a good transparency.

The thus prepared biaxially stretched film was irradiated with a high pressure mercury lamp (80 W/cm) manufactured by Toshiba Denzai K.K. As the result of the irradiation, the viscosity of the film was markedly increased.

For comparison, a biaxially stretched film of polyethylene terephthalate was prepared in substantially the same manner as above, and the resulting film having a thickness of about 15 microns was irradiated, whereby the viscosity was rather decreased.

The results are shown in Table 2, wherein the reduced specific viscosity ($\eta_{sp/c}$) was determined by dissolving the film tested (100 mg) in a mixture of phenol and symtetrachloroethane (6:4 by weight) (25 ml) and measuring at 30° C. by the aid of an Ostwald viscometer.

TABLE 2

| Irradiation conditions | | Example 5 | Comparison |
|---|---|---|---|
| Distance from lamp (cm) | Irradiation time (sec.) | Reduced specific viscosity (dl/g) | Reduced specific viscosity (dl/g) |
| not irradiated | 0 | 0.621 | 0.662 |
| 10 | 1 | 0.704 | — |
| 10 | 2 | 0.841 | 0.649 |
| 10 | 3 | 0.952 | — |
| 10 | 4 | 1.053 | 0.643 |
| 15 | 3 | 0.762 | 0.656 |
| 15 | 6 | 0.919 | 0.652 |
| 25 | 3 | 0.713 | — |
| 25 | 6 | 0.826 | 0.657 |
| 25 | 9 | 0.931 | — |
| 25 | 12 | 1.025 | 0.654 |

EXAMPLE 6

The polymer having units of N,N'-bis(β-hydroxyethyl)benzophenonetetracarboxylic acid imide in a content of 2 mol % (based on the ester linkage therein) (one structural unit (I) per 100 ester linkages) obtained in Example 4 or a polymer blend obtained by mixing the said polymer and polyethylene terephthalate having a reduced specific viscosity of 0.660 dl/g in a weight ratio of 1:3 by the use of a V shape blender and having units of N,N'-bis(β-hydroxyethyl)benzophenonetetracarboxylic acid imide in a content of 0.5 mol % (based on the total ester linkage in the polymer and the polyethylene terephthalate) (0.25 structural unit (I) per 100 total ester linkages) was extruded by the use of an apparatus as used in Example 5 to make an unstretched film, which was subjected to sequential and biaxial stretching to make a biaxially stretched film of 15 microns in thickness. The biaxially stretched film was then irradiated with a high pressure mercury lamp for 2 seconds. The variation of the viscosity with the change of the distance from the lamp was examined.

The results are shown in Table 3, from which it is understood that the films in case of the polymer having an N,N'-bis(β-hydroxyethyl)benzophenonetetracarboxylic acid imide content of 2 mol % and in case of the polymer blend having an N,N'-bis(β-hydroxyethyl)benzophenonetetracarboxylic acid imide content of 0.5 mol % showed remarkable increase in viscosity, while the film in case of polyethylene terephthalate for comparison showed decrease in viscosity.

TABLE 3

| | Reduced specific viscosity (dl/g) | | |
|---|---|---|---|
| | Example 6 | | |
| Distance from lamp (cm) | Polymer (2 mol % content) | Polymer blend (0.5 mol % content) | Comparison Polyethylene terephthalate |
| Not irradiated | 0.646 | 0.617 | 0.662 |
| 25 | 0.741 | 0.625 | 0.660 |
| 20 | 0.762 | 0.665 | — |
| 15 | 0.856 | 0.714 | 0.658 |
| 10 | — | 0.785 | 0.649 |
| 7 | — | 0.772 | 0.648 |

EXAMPLE 7

The folding resistance of the film prepared in Example 5 was determined at a temperature of 20° C. under a humidity of 65% by the use of a folding tester (MIT type; JIS (Japanese Industrial Standard) P-8115). The film of the invention of which the viscosity was increased on the irradiation with a high pressure mercury lamp showed remarkable increase in folding resistance. The film of polyethylene terephthalate and the unirradiated film showed low folding strength. Measurement of the folding strength was carried out by cutting the film to get a specimen in a band form having 1 cm wide and charging a load of 1 kg onto the specimen. The results are shown in Table 4.

TABLE 4

| Film | Reduced specific viscosity (dl/g) | Folding resistance (times) |
|---|---|---|
| Polyethylene terephthalate, unirradiated | 0.662 | $24.5 \times 10^4$ |
| Polymer (0.5 mol % content), unirradiated | 0.621 | $21.3 \times 10^4$ |
| Polymer (0.5 mol % content), irradiated for 2 seconds with a distance of 10 cm | 0.841 | $86.8 \times 10^4$ |
| Polymer (0.5 mol % content), irradiated for 3 seconds with a distance of 10 cm | 0.952 | $114.8 \times 10^4$ |

EXAMPLE 8

The polymer (2 mol % content) obtained in Example 4 (100 parts), a non-inflammable agent "AFR-3001X" (a brominated aromatic compound, manufactured by Asahi Glass Co., Ltd.) (15 parts) and antimony trioxide as a non-inflammable aid (5 parts) were mixed together by the use of a V shape blender, and the resulting mixture was extruded at a temperature of 290° C. by the aid of an extruder. The extruded product was cooled and cut to make pellets. The pellets were crushed and dried at 140° C. in vacuo overnight. The above crushed material with a copper foil "T5A" (manufactured by Fukuda Metal Foil and Powder Ind. Co.) and/or a glass cloth "EPC 070" (manufactured by Arisawa Mfg. Co.) was pressed at a temperature of 290° C. by the use of a hydraulic press to make a layered sheet useful as a carrier tape of integrated circuit.

The layered sheet was heat treated at 180° C. using the said hydraulic press and irradiated with a high pressure mercury lamp as used in Example 5 at a distance of 10 cm while travelling with a speed of 0.6 m/min.

For comparison, the similar layered sheets to the above were prepared but using as the resinous material polyethylene terephthalate or the polymer (2 mol % content) not incorporated with any non-inflammable agent or aid. Also, commercially available glass cloth-reinforced triazine resin was used.

The layered sheets were subjected to various tests including non-inflammability, heat resistance and folding resistance, which were carried out as follows:

Non-inflammability was tested by suspending vertically a test piece of the layered sheet (1×10 cm), contacting the flame of firing match to the lower end of the test piece for 3 seconds and observing the firing of the test piece. The fired one was indicated by X and the nonfired one by O.

Heat resistance was tested by immersing a test piece of the layered sheet in silicone oil kept at 280° C. for 10 seconds and observing the change of the shape. The changed one was indicated by X and the unchanged one by O.

Folding resistance was tested by folding at an angle of 180° and observing any breakage. The broken one was indicated by X and the unbroken one by O.

The results are shown in Table 5.

TABLE 5

| Layered product | Thickness (μ) | Irradiation | Non-inflammability | Heat resistance | Folding resistance |
|---|---|---|---|---|---|
| Glass cloth/polyethylene terephthalate | 150 | Not irradiated | X | X | O |
| Glass cloth/polymer (2 mol % content) (without non-inflammable agent) | 150 | Not irradiated | X | X | O |
| Glass cloth/polymer (2 mol % content) (with non-inflammable agent) | 150 | Irradiated | O | O | O |
| Glass cloth/polymer (2 mol % content) (with non-inflammable agent) | 150 | Not irradiated | O | X | O |
| Glass cloth/polymer (2 mol % content)/copper (with non-inflammable agent) | 150 | Irradiated | O | O | O |
| Glass cloth/polymer (2 mol % content)/copper (with non-inflammable agent) | 150 | Not irradiated | O | X | O |
| Copper/polymer (2 mol % content) (with non-inflammable agent) | 100 | Irradiated | O | O | O |
| Copper/polymer (2 mol % content) (with non-inflammable agent) | 100 | Not irradiated | O | X | O |
| Copper/polyethylene terephthalate | 100 | Not irradiated | X | X | O |
| Commercially available glass cloth reinforced triazine resin | 110 | Not irradiated | X | O | X |

EXAMPLE 9

A biaxially stretched film of the polymer (2 mol % content) obtained in Example 6 was irradiated with a high pressure mercury lamp as used in Example 5, and the resulting physical properties were examined.

The results are shown in Table 6, wherein the physical properties were determined as follows:

Melt cutting temperature was determined by charging a load of 0.1 g on a test piece of the film cut in 1 mm wide and 25 mm long and heating the test piece in air with an elevation of 4° C./minute to observe the temperature at the cutting of the test piece.

Heat resistance was determined by dipping a test piece of the film in silicone oil kept at 280° C. for 10 seconds and observing the change of its shape.

Insoluble materials were determined by admitting a test piece of the film (1 g) and a mixture of phenol and sym-tetrachloroethane in a weight ratio of 6:4 (250 ml) into a 300 ml volume flask and allowing the flask to stand in an oil bath at 120° C. for 2 hours with occasional shaking. After 2 hours, the flask was taken out from the oil bath and cooled. The contents were filtered with a glass filter No. 2 with suction. The insoluble materials collected on the glass filter were washed with chloroform and acetone in order, dried at 120° C. in vacuo for 2 hours, cooled and weighed. From the resulting weight and the initial weight, the insoluble material content (%) was calculated.

TABLE 6

| | Irradiation conditions | | Melt cutting temp. (°C.) | Heat resistance | Insoluble materials (%) |
|---|---|---|---|---|---|
| | Distance from lamp (cm) | Time (sec.) | | | |
| Polyethylene terephthalate | — | 0 | 239 | X | 0 |
| Polymer (2 mol % content) | — | 0 | 231 | X | 0 |
| Polymer (2 mol % content) | 25 | 300 | 285 | O | 79 |

EXAMPLE 10

As in Example 5 but heat treating at a temperature of 230° C. under a relaxation of 10%, the polymer (0.5 mol % content) was stretched sequentially and biaxially to make a biaxially stretched film. The biaxially stretched film was irradiated in the same manner as in Example 5 and subjected to testing for heat shrinkage according to the method as described in JIS C-2318. For comparison, a biaxially stretched film of polyethylene terephthalate was also subjected to the same test.

The results are shown in Table 7.

TABLE 7

| Irradiation conditions | | Heat shrinkage (%) | |
|---|---|---|---|
| Distance from lamp (cm) | Time (sec.) | Example 10 | Comparison |
| 15 | 0 | 1.10 | 1.10 |
| 15 | 3 | 0.75 | 1.15 |
| 15 | 6 | 0.15 | 0.35 |
| 15 | 9 | 0 | 0.20 |

EXAMPLE 11

The biaxially stretched film obtained in Example 5 was subjected to testing for heat resistance at high temperature. Deterioration of the film was effected by the use of a gear type aging tester 104 HG2 manufactured by Negoro Mfg. Co., Ltd. at a temperature of 180° C. for a period of 21 days, and then the change of the resulting film in strength and elongation was observed according to the method as described in JIS C-2318. The results are shown in Table 8.

TABLE 8

| Polymer | Irradiation | Before deterioration | | | | After deterioration | |
|---|---|---|---|---|---|---|---|
| | | Thickness ($\mu$) | Reduced specific viscosity (dl/g) | Strength (kg/mm$^2$) | Elongation (%) | Retention of strength (%) | Retention of elongation (%) |
| Polymer (0.5 mol % content) | Irradiated | 15 | 0.998 | 18.3 | 26 | 68 | 91 |
| Polymer (0.5 mol % content) | Not irradiated | 15 | 0.618 | 25.5 | 46 | 45 | 17 |
| Polyethylene terephthalate | Irradiated | 15 | 0.584 | 26.6 | 50 | 48 | 14 |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for enhancing the physical and chemical properties of a shaped article of a polymeric composition, which comprises melt forming into a shaped article a polymer composition comprising as the essential component a saturated linear polyester comprising structural units from dicarboxylic acids, diols, lactones, oxycarboxylic acids, or functional derivations thereof and a structural unit selected from one of:

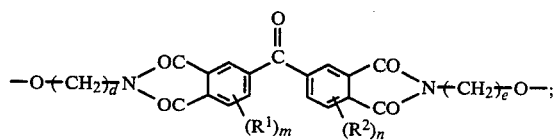

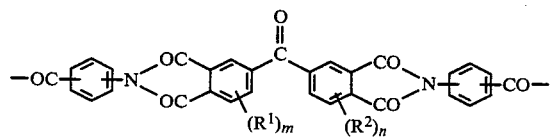

and

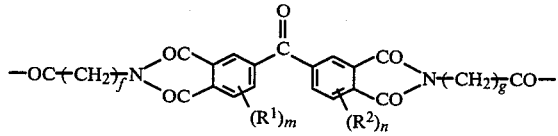

wherein $R^1$ and $R^2$ are the same or different and each represents a monovalent organic group, m and n are each an integer of 0 to 3, d and e are each an integer of 2 to 6, and f and g are each an integer of 1 to 6, in an amount of 0.01 to 50 moles per 100 moles of the total ester linkage in the molecule of the polyester and irradiating the shaped article with actinic radiation.

2. The method according to claim 1, wherein m and n are each zero.

3. The method according to claim 1, wherein said monovalent organic group is an aliphatic, alicyclic or aromatic group having 1 to 10 carbon atoms.

4. The method according to claim 1, wherein not less than 50 mol % of said dicarboxylic acid units are units of a benzenedicarboxylic acid and not less than 50 mol % of said diol units are units of an alkylene glycol having 2 to 10 carbon atoms.

5. The method according to claim 1, wherein said saturated linear polyester comprises units of terephthalic acid as said dicarboxylic acid units and units of an alkylene glycol having 2 to 10 carbon atoms and of the following formula in a molar proportion of 99.9:0.1 to 80:20 as the diol units:

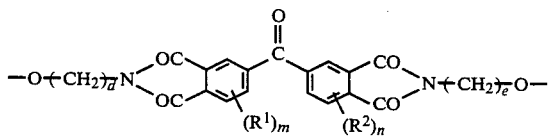

wherein d and e are each an integer of 2 to 6 and $R^1$, $R^2$, m and n are each as defined in claim 1.

6. The method according to claim 1, wherein said shaped article is an undrawn film.

7. The method according to claim 1, wherein said shaped article is a drawn film.

8. The method according to claim 1, wherein said shaped article is a fiber.

9. The method according to claim 1, wherein said shaped article is a fabric.

10. The method according to claim 1, wherein said actinic radiation comprises ultraviolet rays having a wavelength of 200 to 400 m$\mu$.

11. An article melt formed into a shaped article made of a polymeric composition comprising as the essential component a saturated linear polyester comprising structural units from dicarboxylic acids, diols, lactones, oxycarboxylic acids, or functional derivations thereof and a structural unit selected from one of:

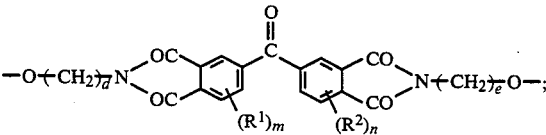

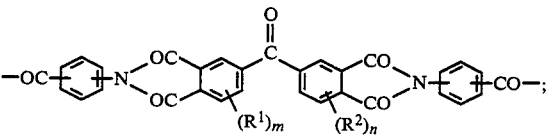

and

-continued

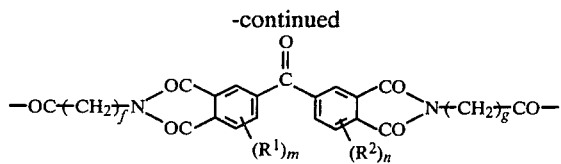

wherein $R^1$ and $R^2$ are the same or different and each represents a monovalent organic group, m and n are each an integer of 0 to 3, d and e are each an integer of 2 to 6, and f and g are each an integer of 1 to 6, in an amount of 0.01 to 50 moles per 100 moles of the total ester linkage in the molecule of the polyester, irradiated by actinic radiation.

12. The shaped article according to claim 11, wherein m and n are each zero.

13. The shaped article according to claim 11, wherein said monovalent organic group is an aliphatic, alicyclic or aromatic group having 1 to 10 carbon atoms.

14. The shaped article according to claim 11, wherein not less than 50 mol % of said dicarboxylic acid units are units of a benzenedicarboxylic acid and not less than 50 mol % of said diol units are units of an alkylene glycol having 2 to 10 carbon atoms.

15. The shaped article according to claim 11, wherein said essential component is a polyester comprising units of terephthalic acid as the dicarboxylic acid units and units of an alkylene glycol having 2 to 10 carbon atoms and of the following formula in a molar proportion of 99.9:0.1 to 80:20 as the diol units:

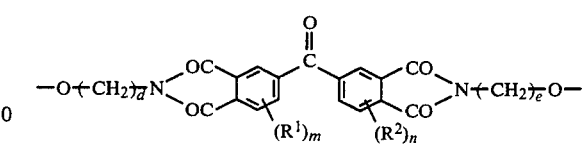

wherein d and e are each an integer of 2 to 6 and $R^1$, $R^2$, m and n are each as defined in claim 1.

16. The shaped article according to claim 11, wherein said shaped article is an undrawn film.

17. The shaped article according to claim 11, wherein said shaped article is a drawn film.

18. The shaped article according to claim 11, wherein said shaped article is a fiber.

19. The shaped article according to claim 11, wherein said shaped article is a fabric.

20. The shaped article according to claim 11, wherein said actinic radiation comprises ultraviolet rays having a wavelength of 200 to 400 mµ.

* * * * *